United States Patent
Johnson et al.

(10) Patent No.: US 7,760,910 B2
(45) Date of Patent: Jul. 20, 2010

(54) EVALUATION OF VISUAL STIMULI USING EXISTING VIEWING DATA

(75) Inventors: Colin Johnson, San Francisco, CA (US); Gregory T. Edwards, Roseville, CA (US)

(73) Assignee: Eyetools, Inc., Newark, CA (US)

( * ) Notice: Subject to any disclaimer, the term of this patent is extended or adjusted under 35 U.S.C. 154(b) by 889 days.

(21) Appl. No.: 11/638,133

(22) Filed: Dec. 12, 2006

(65) Prior Publication Data

US 2007/0146637 A1    Jun. 28, 2007

Related U.S. Application Data

(60) Provisional application No. 60/749,726, filed on Dec. 12, 2005.

(51) Int. Cl.
G06K 9/00 (2006.01)

(52) U.S. Cl. ............... 382/103; 382/209; 382/284; 382/294

(58) Field of Classification Search ............... 382/103, 382/209, 284, 294
See application file for complete search history.

(56) References Cited

U.S. PATENT DOCUMENTS

| | | | |
|---|---|---|---|
| 5,844,824 A | 12/1998 | Newman et al. | |
| 5,886,683 A | 3/1999 | Tognazzini et al. | |
| 6,090,051 A | 7/2000 | Marshall | |
| 6,102,870 A | 8/2000 | Edwards | |
| 6,106,119 A | 8/2000 | Edwards | |
| 6,359,601 B1 | 3/2002 | Maguire, Jr. | |
| 6,405,159 B2 | 6/2002 | Bushey et al. | |
| 6,433,760 B1 | 8/2002 | Vaissie et al. | |
| 6,601,021 B2 | 7/2003 | Card et al. | |
| 6,608,615 B1 | 8/2003 | Martins | |
| 6,697,818 B2 | 2/2004 | Li et al. | |
| 6,755,527 B1 | 6/2004 | Goldberg | |
| 6,778,150 B1 | 8/2004 | Maguire, Jr. | |
| RE38,668 E | 12/2004 | Edwards | |
| 6,867,753 B2 * | 3/2005 | Chinthammit et al. | 345/8 |
| 7,384,399 B2 * | 6/2008 | Ghajar | 600/558 |
| 2003/0122839 A1 | 7/2003 | Matraszek et al. | |
| 2005/0108092 A1 | 5/2005 | Campbell et al. | |
| 2006/0161144 A1 | 7/2006 | Li | |
| 2007/0040799 A1 | 2/2007 | Singh et al. | |

(Continued)

OTHER PUBLICATIONS

Office Action for U.S. Appl. No. 11/584,382 mailed Oct. 5, 2009, 11 pgs.

(Continued)

*Primary Examiner*—Tom Y Lu
(74) *Attorney, Agent, or Firm*—Blakely Sokoloff Taylor & Zafman

(57) ABSTRACT

Methods and apparatuses for evaluation of visual stimuli using existing viewing data. An embodiment of a method includes storing viewing data relating to the viewing of visual stimuli. In addition, parameters relating to the stored viewing data are stored. A first visual stimulus for analysis is received. In order to analyze the first visual stimulus, the target parameters for the first visual stimulus are matched with the parameters for the stored viewing data. If there is a sufficient match between the target parameters with the parameters for the stored viewing data, data to represent the first visual stimulus is generated based at least in part on the stored viewing data.

32 Claims, 5 Drawing Sheets

U.S. PATENT DOCUMENTS

2007/0066916 A1  3/2007 Lemos

OTHER PUBLICATIONS

Office Action for U.S. Appl. No. 10/821,800 mailed Jun. 22, 2007, 11 pgs.

Final Office Action for U.S. Appl. No. 10/821,800 mailed Jan. 28, 2008, 13 pgs.

Office Action for U.S. Appl. No. 10/821,800 mailed Jul. 21, 2007, 12 pgs.

Office Action for U.S. Appl. No. 11/584,382 mailed Sep. 16, 2008, 12 pgs.

Office Action for U.S. Appl. No. 10/821,800 mailed Jan. 14, 2009, 13 pgs.

Hatfield, et al., "An Interface integrating eye gaze and voice recognition for hands-free computer access", *Synthetic Environment*, Nov, 30, 1997, pp. 1-7.

Hatfield, et al., "Eye/Voice mission planning interface (EVMPI)", *Synthetic Environments, Inc.*, Dec. 1995, 113 pgs.

Privitera, et al., "Algorithms for defining visual-of-interest: comparison with eye fixations", *IEEE Transactions on Pattern Analysis and Machine Intelligence*, vol. 22, No. 9, Sep. 2000, pp. 970-982.

USPTO, "5812P005 FOA Mailed Mar. 19, 2009 for U.S. Appl. No. 11/584,382", (Mar. 19, 2009), Whole Document.

Edwards, Gregory T., et al., "Method and Apparatuses for Use of Eye Interpretation Information", U.S. Appl. No. 10/821,800, filed Apr. 6, 2004.

Edwards, Gregory T., et al., "Methods and Apparatuses for Collection, Processing, and Utilization of Viewing Data", U.S. Appl. No. 11/584,382, filed Oct. 19, 2006.

\* cited by examiner

EVALUATION OF VISUAL STIMULI USING EXISTING VIEWING DATA

RELATED APPLICATIONS

This U.S. Patent application claims priority to provisional application No. 60/749,726, filed Dec. 12, 2005, entitled "Eyetracking-based Evaluation of Stimuli (Visual Design, Content, Interface, or Other Item That People Look At) Using Archived or Historical Data."

TECHNICAL FIELD

The invention relates to viewing data operations. More particularly, the invention relates to evaluation of visual stimuli using existing viewing data.

BACKGROUND

Visual stimuli may be evaluated using viewing data regarding the stimuli to evaluate the effect on the stimuli on a viewer. Viewing data may be collected using devices such as eyetracking devices, which operate to track the movement of a person's face and eyes as that person engages in an activity. In particular, eyetracking devices may record viewing data in connection with the use of a computer system. Eyetracking devices may consist of a camera and associated electronic components to produce data representing gaze positions. This data can be used to determine where the individual is looking, which can be described in terms of fixations (a steady gaze for a predetermined period of time) and saccades (movement of the gaze between two points).

Eyetracker data may be combined with data representing graphical or visual images presented to a user to generate viewing data indicating what a person was viewing. The viewing data can be used, for example, to determine whether a viewer has looked at all of the information presented, or whether a person made certain choices in connection with the information presented. The viewing data may be presented in a report, which may include graphical representations of the data.

Viewing data may be collected for the purpose of studying particular presentations, web sites, advertising, or other visual stimuli, and studies are generally conducted for certain intended users of the data. However, in conventional operations the recording and processing of viewing data are closely connected, such as in the operation of single machine. The interconnection of recording and processing of data means that the collector of data also has access to analysis, and to the purposes of the data collection, which creates implications for data security and other issues. The collection of viewing data may include the processing provided in U.S. Pat. No. 6,712,468, regarding a "heat map" that is generated from collected data.

However, conventional operations assume that any analysis generated with regard to a given visual stimulus was generated from data collected using that exact same stimulus to which the analysis is associated. In general it is necessary to gather eye-tracking data for every new presentation of stimuli in order to estimate how changes in the stimuli may affect a viewer. For example, if a computer web page or other visual representation is modified, a new test of the effectiveness of the presentation may be needed for each version of the presentation.

DESCRIPTION OF THE DRAWINGS

The invention is illustrated by way of example, and not by way of limitation, in the figures of the accompanying drawings in which like reference numerals refer to similar elements.

DETAILED DESCRIPTION

Figure 1:
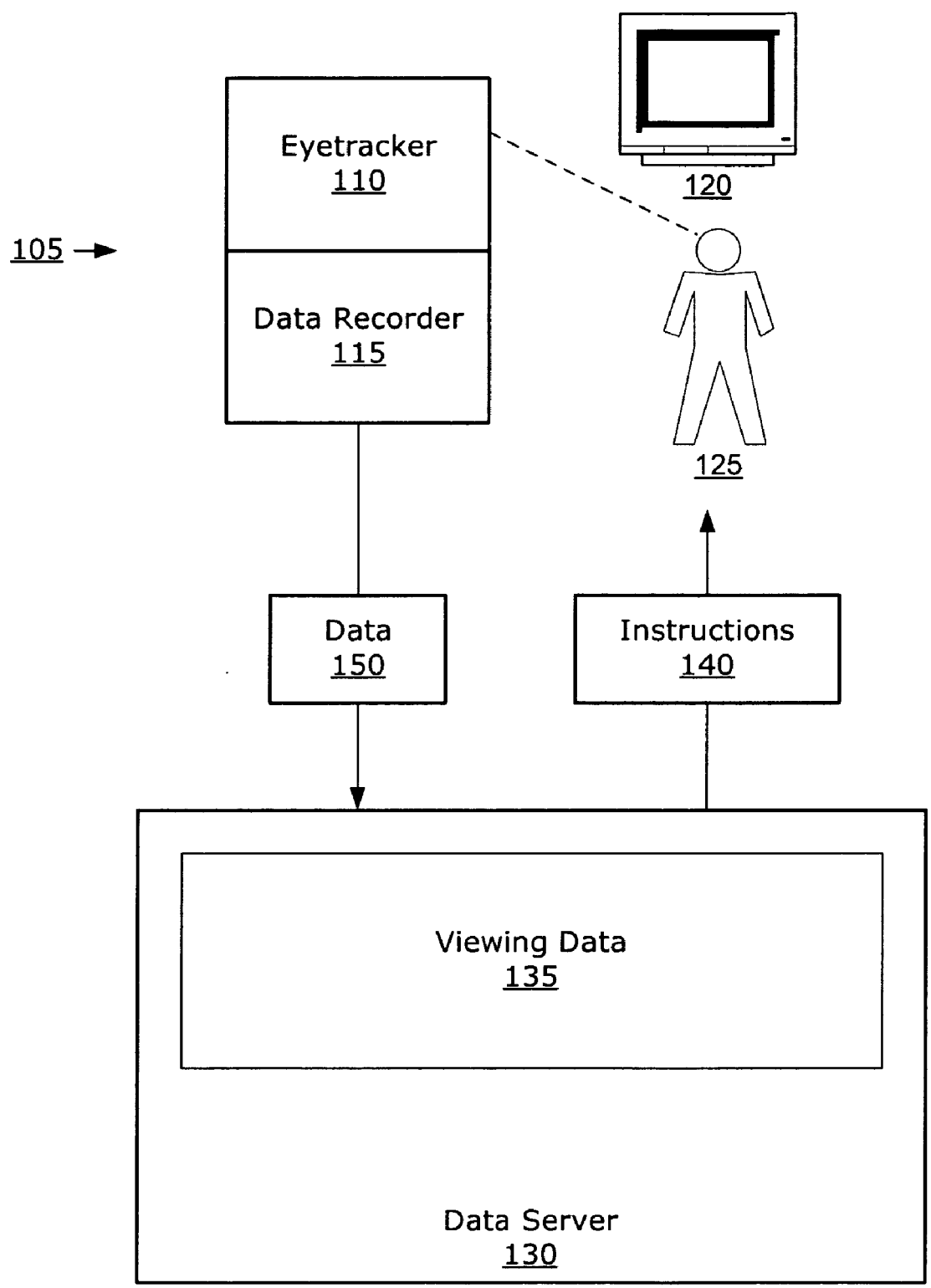
FIG. 1 is an illustration of a system for recording and processing of viewing data.

Techniques for evaluation of visual stimuli using existing viewing data.

In the following description, for purposes of explanation, numerous specific details are set forth in order to provide a thorough understanding of the invention. It will be apparent, however, to one skilled in the art that the invention can be practiced without some of these specific details. In other instances, structures and devices are shown in block diagram form in order to avoid obscuring the invention.

For the purposes of the following description:

"Visual stimulus" means any visual phenomenon that is viewed by a person or group.

"Viewing data" means data concerning what a person or persons has viewed. The term may include, but is not limited to data collected regarding the viewing of a computer screen or other computer presentation.

"Eyetracker" means any method, device, system, or technique for measuring and reporting where a person, group of people, or other entity is looking. An eyetracker may provide such measurements in 2, 3, 4, or more dimensions. An eyetracker may be used in the collection of viewing data.

"Eyetracker data" means data returned by an eyetracker. Eyetracker data for a person may include data for one eye, for two eyes, or for a combination of the eyes' data. For example, eyetracker data may include x-axis, y-axis and/or z-axis coordinates, time, pupil diameter, percent of time eyelid is open, object(s) being viewed on a computer screen or in the world or an environment (reported explicitly or implicitly via the coordinate system), distance from eye(s) to the point or object being viewed, extent of peripheral vision, and/or other eye-related data. Viewing data may include eyetracker data.

"Eye Interpretation Engine" or "EIE" means any technique, algorithm embodied in computer-readable instructions, circuit and/or device capable of computing higher-level characteristics and/or behaviors from eyetracking data from one or more people, with or without additional environmental data or supporting context. EIEs may also add data to the eyetracking data such as probable field of peripheral vision for an individual or a group, or related to the object being viewed if it is known, as well as other data that would be a super-set of that returned by an eyetracker. An EIE may be used in the generation of viewing data based on collected eyetracker data.

"Application" means any technique, algorithm embodied in computer-readable instructions, a circuit, and/or a device that receives input signals or data and generates output data or signals.

"Eye-Aware Application" means an application that makes use of eyetracking data.

In an embodiment of the invention, a system is provided for evaluation of visual stimuli using existing viewing data. In an embodiment of the invention, a system generates data to represent the viewing of a visual stimulus based upon existing viewing data. In an embodiment of the invention, data regarding a visual stimulus may not be collected or generated from the viewing of the exact visual stimulus in question, but may instead be generated wholly or in part from data collected on visual stimulus that is similar to or equivalent with the visual stimulus in question.

In an embodiment of the invention, a system stores viewing data regarding multiple visual stimuli. The storage of such viewing data may be of any form, but for simplicity such storage is referred to herein as a database. In an embodiment, the system locates data within the database to represent all or a part of a visual stimulus, thereby allowing the stimuli to be evaluated without requiring testing in every case. For example, viewing data may be collected with regard to multiple visual stimuli. A second stimulus may include characteristics that are comparable to one or more of the examined visual stimulus. The viewing data for the examined visual stimulus may be utilized or combined with other data, allowing an analysis to be generated for the second stimulus without collecting new viewing data. The existing viewing data may be used in various ways. For example, existing viewing data may be identified as matching the visual stimulus. (In a very simple example, the existing viewing data may be identified as matching the visual stimulus if attributes of the existing viewing data are the same as attributes of the visual stimulus, but more complex matching may be applied in other embodiments of the invention.) In another example, a combination of existing data may be identified to represent all or part of the visual stimulus. Combinations of existing data may vary in different circumstances. A combination of existing data may include one or more existing data elements that map directly to one or more portions of the visual stimulus, multiple existing data elements that are blended (for example, averaged) to represent one or more portions of the visual stimulus, or a combination of directly mapped and blended elements. In another example existing viewing data may be identified to represent a part of the visual stimulus. In a specific example, a visual stimulus may be modified to add a new element or to move an existing element to another location, and the existing viewing data may be used to represent the modified stimulus. Existing data may be used in other similar combinations to generate the needed data for analysis.

In an embodiment of the invention, viewing data may include external descriptor parameters (which may also be referred to as tags or metadata) containing data regarding the visual stimulus or one or more portions of the visual stimulus, the persons viewing the visual stimulus, or other related information. In an embodiment, the parameter data may be added by any party, including the subjects of testing regarding the visual stimuli, persons representing an analysis service, or any other person. In another embodiment, the parameter data may be generated automatically by an apparatus or system.

In an embodiment of the invention, a system includes a server that provides for the processing of viewing data, including the analysis and distribution of such data, and includes a data source that records viewing data for the use of the server. In an embodiment of the invention, the operation of the server and the data source are separated, with the data source being responsible only for the recording. In an embodiment, a data source records viewing data for activities under the direction of a server without requiring any knowledge regarding the purpose of the recorded data. As used herein, "server" means any computer device that is responsible for all or part of the processing of viewing data, or the provision of instructions relating to the collection of viewing data. A server may include multiple computers, including, for example, multiple server units that operate to handle different aspects of data processing.

In design testing, eye-tracking technology may be used to assess a visual phenomenon, such as what the phenomenon effectively communicates and what it does not successfully communicate. For example, one or more individuals may be presented with the visual stimulus while their gaze is tracked. Based on the viewing patterns that are revealed in the data, a researcher may assess the effectiveness of the design. The test subjects may be chosen based on particular demographic information.

However, the usual requirement for this type of analysis is that test subjects representing the required demographics be presented with the visual stimulus in each case, and that data regarding their viewing of the stimulus be recorded for analysis. This process requires, for example, renewed tests for each modification of the visual stimulus.

In an embodiment of the invention, a process is provided to generate an assessment of a visual stimulus without requiring that the viewing data be gathered and analyzed for the specific stimulus in question. In an embodiment of the invention, visual stimuli may be assessed without the requirement for collecting data for every stimulus. In an embodiment of the invention, stimuli may be analyzed without collecting data on the particular stimulus in question by relying on equivalent or similar viewing data that has already been collected. In an embodiment, equivalent or similar viewing data may be identified through use of parameters associated with the collected viewing data, and comparing such parameters with testing requirements for the new stimulus.

In a conventional collection of viewing data:

(1) Visual stimulus A is analyzed by having one or more individuals view visual stimulus A while their viewing behavior is captured.

(2) The viewing data is mapped and compiled for presentation. The presentation may overlay the images of the visual stimulus to represent how people interacted visually with visual stimulus A. The process may include, but is not limited to, mechanisms and processes described by U.S. Pat. No. 6,712,468, entitled "Techniques for Facilitating Use of Eye Tracking Data".

(3) The analysis of another visual stimulus, visual stimulus B, is conducted by following processes (1) and (2) again.

In an embodiment of the invention, the process for analyzing a visual stimulus may be conducted without requiring the repeated testing process required for conventional analysis.

One method of accomplishing assessment of visual stimuli includes the collection of a large database of viewing data on a wide variety of stimuli. The viewing data, together with information regarding the stimuli or one or more sub-portions of the stimuli from which the data was collected and possibly information about the people viewing the stimuli, will be collected. Information about the people viewing the stimuli may include demographic and psychographic information, past behavior information, current activity and intent information, and other related data.

In an embodiment, when a party wants to evaluate a new visual stimulus that has not yet been added to the database, this may be accomplished by generating likely viewing behavior based in whole or in part on the historical data that already exists in the database. In an embodiment, the external descriptor parameters of existing data will be compared in order to find viewing data from items or portions of items that are similar or equivalent, and to identify data from people who are similar to the target audience for the visual stimulus and who were performing activities that are similar to the target activity of the visual stimulus. The data from those examples within the database may be sampled to create "estimated viewing maps" of likely viewing patterns for the stimulus in question.

In an example, one methodology by which a process could be conducted involves an "E-mail evaluation" concept. In this example, users of an eyetracking machine collect actual data on a variety of similar E-mail designs. These E-mail designs may be typically designed using the same template, and therefore the designs are all similar to, but not exactly like, each other. Once these actual designs are tested, and data regarding them is added to the database, a user may then input a new Stimulus A that resembles the E-mails for which data has been previously collected. In an example, the user may manually select and match which of the archived email designs and viewer group best resemble the design and target parameter to be evaluated, making use of one stimulus which is substantially similar, or making use of portions of multiple stimuli. In another example, the machine or system might automatically assess the best match of historical/archived designs or images to associate with Stimulus A.

Continuing with the example, the machine or system may then take the data from the archived/historical designs that have the best match of target parameters and apply this data to Stimulus A. In this way, Stimulus A may appear to have been tested by having actual people look at it while their viewing behavior is captured and then later analyzed. However, instead the data is generated and applied without the need for additional data collection. This process may provide great efficiencies in design testing because designs/stimuli evaluated in this manner can be assessed much more quickly and inexpensively than if actual data must be collected and reported. Actual testing then may be made of the design or designs showing the best results.

This same approach may be conducted with much larger data sets across a wide variety of visual stimuli in addition to E-mail. Such stimuli could include art, web pages, advertising, television, video, games, environments, etc. or media of all types. Another possible application would be to measure the likely viewing patterns of advertisements within a large variety of different publishing environments. By collecting a large repository of viewing data of how people look at advertisements across a wide variety of publishers or advertising media, with a large variety of different types of people doing a wide variety of different activities, a researcher could then employ this method to estimate how a new advertisement design might perform within a given environment for a given target audience doing a given activity without having to collect vast amounts of additional data. This report of estimated viewing would give a read out of the anticipated viewing performance of the advertisement without having to collect additional data. Once this estimated report is given, the results can be compared to a normative database of viewing data to provide feedback on how well Stimulus A is expected to perform given what is known about how people view it relative to unrelated stimuli.

Embodiments of the invention may be applied to, but are not limited to, evaluation, testing, and measurement applications for visual stimuli. However, there may be many other applications where embodiments of the invention may be applied. Embodiments of the invention may break down into different discrete processes, or may happen simultaneously or in different order. The processes described herein are provided simply to make clear the details of the operations.

In one embodiment of the invention, a process for generating viewing data for a visual stimulus may include:

(1) A large amount of data is collected for a wide variety of people looking at a wide variety of stimuli under a wide variety of circumstances. This viewing data and connected external parameters reside in a database.

(2) Stimulus A is identified as an item to test. The individuals who would be appropriate to view Stimulus A for testing are identified and the activity that the individuals would be performing, or the state of mind that test subjects are in when looking at Stimulus A, is defined.

(3) Stimulus A is input together with relevant information about the Stimulus A, and optionally with information regarding the test subjects intended for Stimulus A. For purposes of definition, this group of parameters will be called the "target parameters".

(4) The system determines which data from its database is similar (by a variety of criteria) to the target parameters. The system also compares the stimuli used to generate the data with the target parameters to Stimulus A, and selects data generated on archived stimuli from the database that most closely resembles Stimulus A.

(5) With or without collecting additional data on Stimulus A, the system creates a data visualization image or a numeric or statistical report from the historical data. This can be overlaid on Stimulus A or can be stand alone. Computational manipulations of any kind may be applied to the data before overlaying it on or associating it to Stimulus A. These computations may include, but are not limited to, processes illustration in U.S. Pat. No. 6,712,468.

In various embodiments of the invention, the connection of a server and a data recorder will vary. In an embodiment, the server and the data recorder are separate units that communicate in various ways, depending on the particular arrangements. For example, the server and the data recorder may be connected via the Internet or another network. In an embodiment, the server and the data recorder are located in separate physical locations. In an embodiment of the invention, collected viewing data is stored, such as in a database. The database may be a part of a data server, or may be separate database of any type.

In an example, a study may include the collection and analysis of viewing data relating to the viewing of computer screens. However, embodiments of the invention are not limited to this example, and may involve the viewing of any phenomena, including, but not limited to, images projected on a screen; real world scenes or displays; shopping aisles and product and advertisement placement in such environment; and other visual stimuli. In this example, the screens may be, for example web pages, but embodiments of the invention are applicable to any computer displays, as well as other types of viewing processes.

FIG. 1 is an illustration of a system for recording and processing of viewing data. In this illustration, a data source 105 includes an eyetracker to generate viewing data that is recorded by a data recorder 115. In one example, the eyetracker may generate data regarding the viewing by an individual 125 of a computer screen 120. However, embodiments of the invention are not limited to this, and may include the viewing of any type of phenomena.

In an embodiment of the invention, a data server 130 is provided to process viewing data 135. The viewing data may include data 150 that is received from the data source 105. In an embodiment of the invention, the data server may further provide instructions 140 regarding what is viewed by the individual 125, thereby directing what activities of the individual will be recorded. In an embodiment of the invention, the instructions 140 are automatically generated based on requests received.

In an embodiment of the invention, the data source 105 operates separately from the data server. In an embodiment, the data source 105 and the data server may exist in separate physical locations. In an embodiment, the data source may not be aware of the purpose of the activities for recording or the identity of the client or clients who are served.

Figure 2:
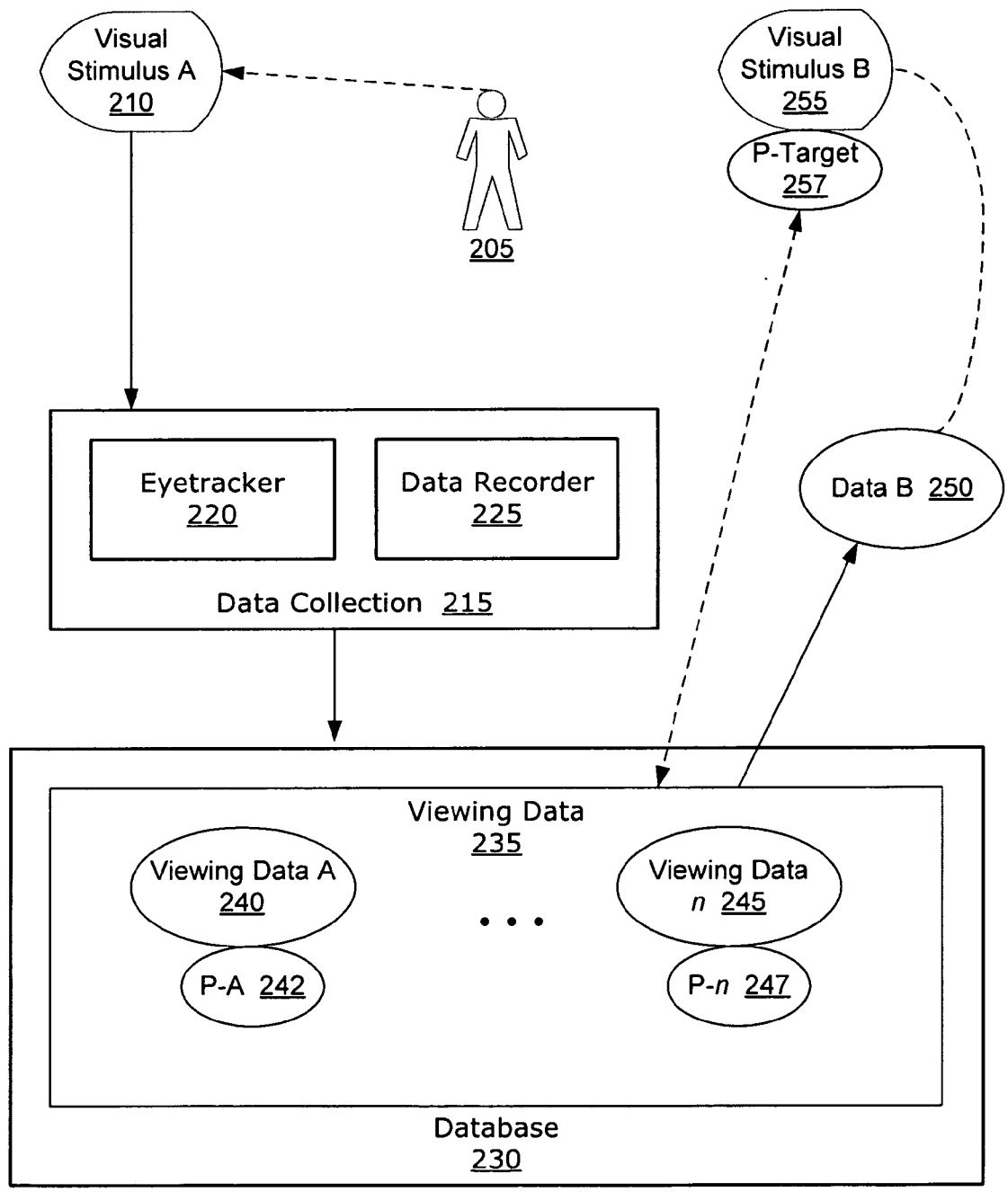
FIG. 2 illustrates an embodiment of a system for the collection of viewing data.

FIG. 2 illustrates an embodiment of a system for the collection of viewing data. In this illustration, one or more test subjects 205 view a visual stimulus A 210. These test subjects and other test subjects may view numerous different stimuli. Viewing data is collected by a data collection system 215, including an eyetracker 220 and a recorder 225. The collected data is stored in a database 230, which may include viewing data 235 from many different stimuli. The contents of the database 230 are shown, for example, as viewing data A 240 for visual stimulus A 210 through viewing data n 245.

In an embodiment, the viewing data 235 may also include external parameters that are associated with the test process and/or stimulus. In particular, the external parameters may include data regarding the visual stimuli or portions of the visual stimuli that generated the viewing data, and possibly the data regarding the test subjects from whom the viewing data was collected. For example, viewing data A 240 may include parameters P-A 242 and viewing data n 245 may include parameters P-n 247.

In an embodiment of the invention, a second stimulus, denoted as visual stimulus B 255 may be subject to analysis. Rather than conduct a full test of visual stimulus, target parameters 257 may be examined to determine whether sufficient test results have already been collected to provide an analysis of the expected viewing patterns for the visual stimulus. The target parameters may include a description of the visual stimulus and of the test subjects required for the analysis. In an embodiment, the target parameters 257 are compared with the external parameters for the previously collected viewing data. If a sufficient match is made, the relevant matching data from the database 230 may be used to generate all or a part of the expected viewing data 250 for visual stimulus B 255. The expected viewing data 250 may then be subject to analysis and presentation as if the complete testing of visual stimulus B 255 had been conducted.

Figure 3:
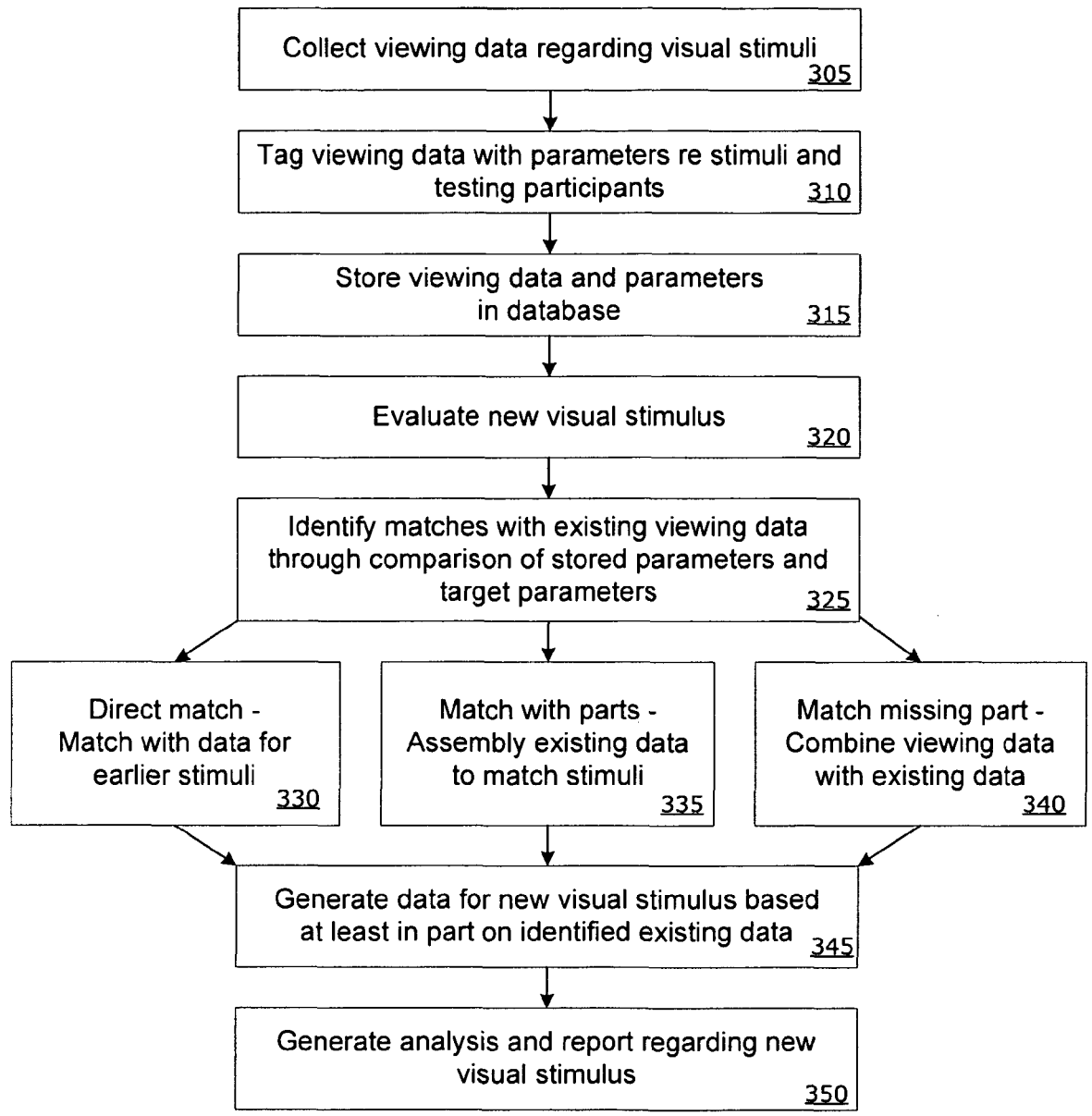
FIG. 3 is a flowchart of an embodiment of a process for analyzing visual stimuli without collecting viewing data.

FIG. 3 is a flowchart of an embodiment of a process for analyzing visual stimuli without collecting viewing data. In this illustration, viewing data is collected regarding various visual stimuli 305. The data may include many different data sets from many different test subjects. The stored data is tagged with parameters that that describe the visual stimuli and the test subjects for the stored data, including, for example, the demographics of the test subjects 310. The viewing data and parameters are stored in a database for future access 315.

A new visual stimulus is then evaluated 320. The stimulus has certain features and possibly certain test participant requirements, which may be described in certain target parameters. In order to determine whether a new test of the visual stimulus is required, there is an attempt to identify matches of the target parameters with the parameters of existing data 325. The matching may vary in different cases as the existing data may be used in various ways to generate the new data. For example, the existing data may provide a direct match for the new stimulus 330. In another example, there may be no direct match, but the new stimulus may be matched with parts of existing data that can be combined to form a whole 335. In another example, it is possible that some viewing data is available for the new stimulus but that some portion is not present, such as if a new element has been added to the stimulus or an existing element has been moved. In one specific example, an advertisement may be added to a web page that didn't exist before, or an existing advertisement may be moved to a new location on the web page. In this case, there may be match for the missing part such that the viewing data for the new stimulus is combined with the existing data 340 to generate the needed viewing data.

If there is a sufficient match, data representing the new stimulus is generated based at least in part on the identified existing data 345, thereby allowing the data to be provided without conducting a new test of the stimulus. Based on such data, an analysis and presentation may be generated for the new visual stimulus 350.

Figure 4:
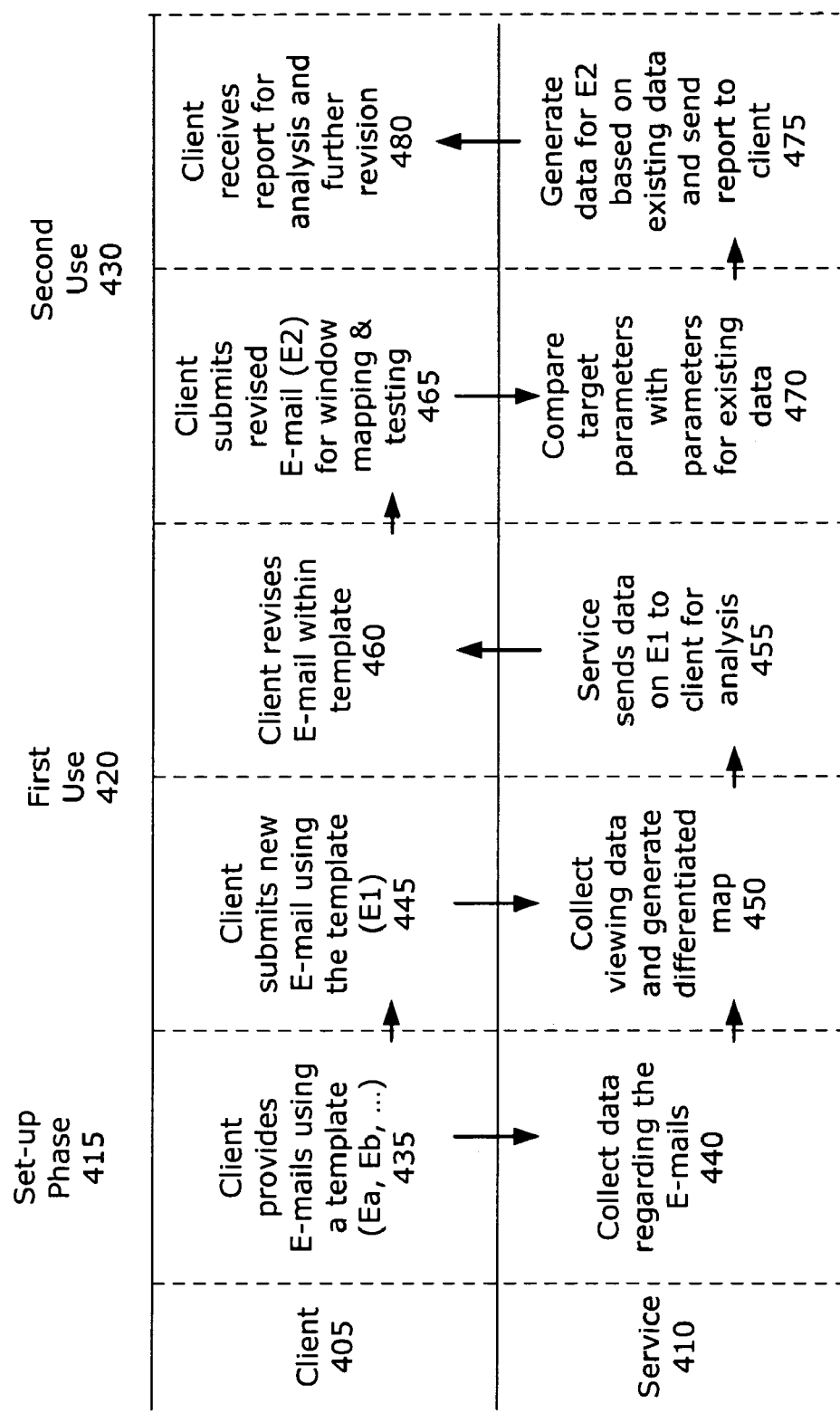
FIG. 4 is an embodiment of a process for generation of data for a revised visual stimulus.

FIG. 4 is an embodiment of a process for generation of data for a revised visual stimulus. In this example a client 405 utilizes a service 410 to generate data and analysis with regard to responses of viewers to E-mail messages. In a set-up phase 415 the client 405 provides multiple E-mail messages, with the messages in this example being generated using a particular template 435. The series of E-mail message may be referred to as Ea, Eb, etc. The service 410 collects viewing data regarding the E-mail messages 440, which may involve the use of eyetracker equipment to gather the viewing data from a group of test subjects, The viewing data also has associated parameter data regarding the E-mail messages (such as identification of the template) and the test subjects who viewed the E-mail messages for testing.

In a first use phase 420 the client 405 submits a new E-mail message (E1), which also is generated using the template 445. In this case, the service 450 collects viewing data for the E-mail message, as well as generating a differentiated map to compare the collected viewing data for E1 with the stored viewing data. The service 410 then sends the data for E1 on to the client for analysis 455.

The client 425 then revises the E-mail, again using the template 460. In a second use phase 430 the client then may submit the revised E-mail (E-2) for mapping and testing 465. However, in an embodiment of the invention it may be possible to generate data for the new E-mail without new testing by utilizing the stored data. In an embodiment, the service 410 compares target parameters for the revised E-mail E2 with parameters for existing data that has already been collected 470. If there is a sufficient match between the target parameters and the parameters of any existing data the service generates data for E2 based at least in part on the existing data, and sends a report to the client 475. The client 405 then may receive the report for analysis and possible further revision 480 without requiring additional testing.

Figure 5:
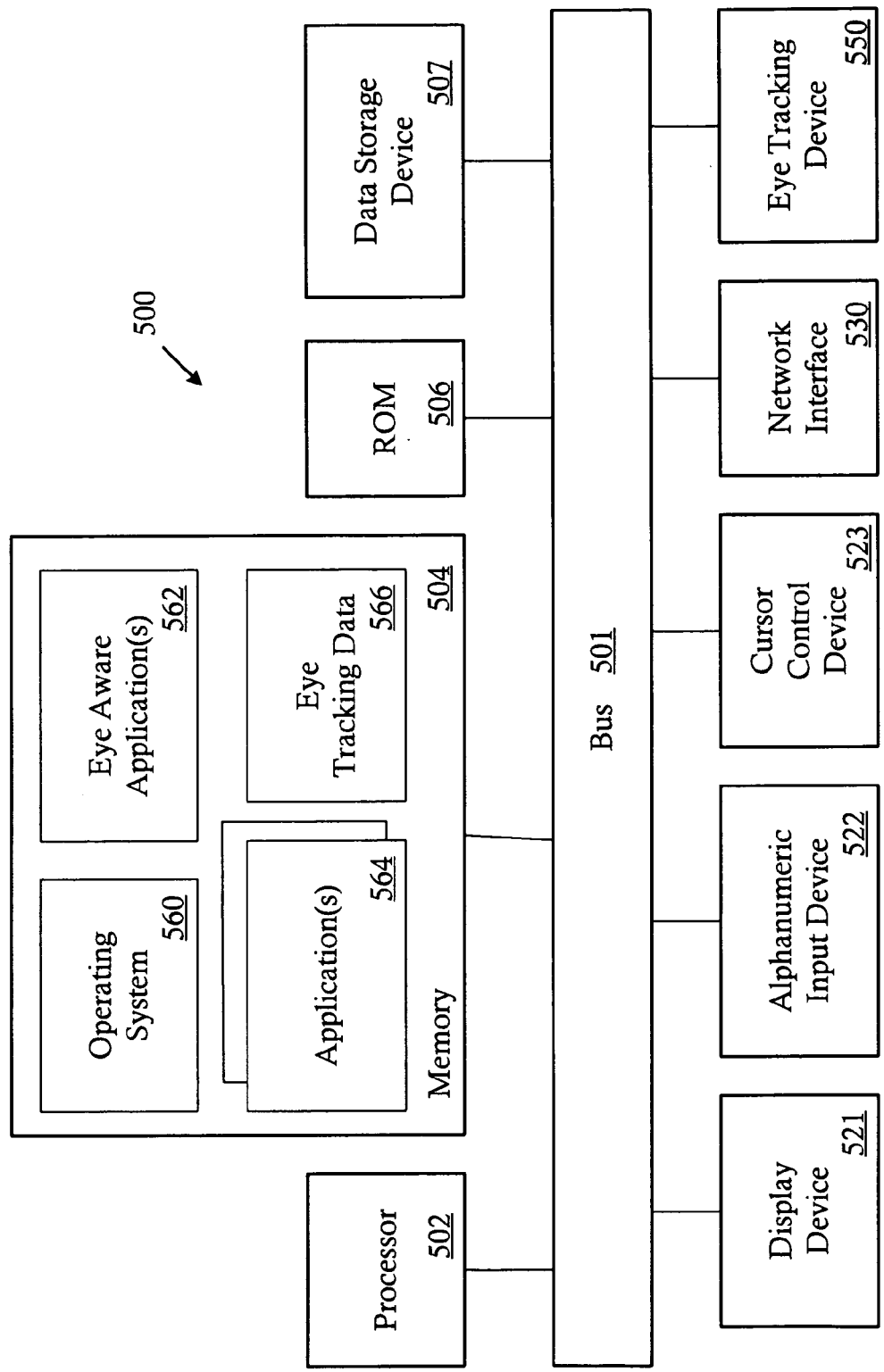
FIG. 5 is a block diagram of an embodiment of an electronic system.

FIG. 5 is a block diagram of an embodiment of an electronic system. The electronic system illustrated in FIG. 5 is intended to represent a range of electronic systems, for example, computer systems, network access devices, personal digital assistants (PDAs), etc. Alternative electronic systems can include more, fewer and/or different components.

The electronic system 500 may include a server or, with the addition of eyetracking capability, may include an eyetracking system. For an eyetracking system, the electronic system 500 may include an eyetracking device; however, the eyetracking device is not required to be part of the same electronic system that processes the eyetracking data. That is, the eyetracking device may be remote with respect to electronic system 500. As another example, of an alternate embodiment with respect to FIG. 5, electronic system 500 may include an eyetracking device, but eyetracking application, an eye interpretation engine or other device or application that makes use of eyetracking data from the eyetracking device may be remote with respect to electronic system 500.

Electronic system 500 includes bus 501 or other communication device to communicate information, and processor 502 coupled to bus 501 to process information. While electronic system 500 is illustrated with a single processor, electronic system 500 can include multiple processors and/or co-processors. Electronic system 500 further includes random access memory (RAM) or other dynamic storage device 504 (referred to as memory), coupled to bus 501 to store information and instructions to be executed by processor 502. Memory 504 also can be used to store temporary variables or other intermediate information during execution of instructions by processor 502. If the electronic system 500 represents a server, the memory 504 may include one or more analysis modules for the analysis of viewing data.

Electronic system 500 also includes read only memory (ROM) and/or other static storage device 506 coupled to bus 501 to store static information and instructions for processor 502. Data storage device 507 is coupled to bus 101 to store information and instructions. Data storage device 507 such as a magnetic disk or optical disc and corresponding drive can be coupled to electronic system 500. If the electronic system 500 represents a server, the data storage device 507 may include a database of viewing data received from various sources. The data may include collected viewing data and parameters regarding, for example, the visual stimuli used and the test participants who were involved. The data may be matched with new stimuli to generate data for stimuli without requiring new testing in every case.

Memory 504 may includes eye aware application(s) 562 that operate on eyetracking data 566 to generate output representative of viewing data. Additional eyetracking data (not shown in FIG. 5) can be stored on storage device 507 or accessed via network interface 530.

Memory 504 contains operating system 560, which directs operations of system 500. In one embodiment, operating system 560 is the highest layer of control of system 500. Applications 564 are lower layers of system control in that they direct operation within the allowable context of higher system layers. Application(s) 564 may contain user programs (e.g., word processor(s), electronic mail (e-mail) programs).

Electronic system 500 can also be coupled via bus 501 to display device 521, such as a cathode ray tube (CRT) or liquid crystal display (LCD), to display information to a computer user. Alphanumeric input device 522, including alphanumeric and other keys, is typically coupled to bus 501 to communicate information and command selections to processor 502. Another type of user input device is cursor control 523, such as a mouse, a trackball, or cursor direction keys to communicate direction information and command selections to processor 502 and to control cursor movement on display 521. Electronic system 500 further includes network interface 530 to provide access to a network, such as a local area network or the Internet.

Eyetracking device 550 is coupled to bus 501 and generates eyetracking data 566 that can be stored in memory 504 and/or storage device 507. Eyetracking device 550 can be any type of eyetracking device known in the art. For example, eyetracking device 550 can track eye movement via optical, electrical, magnetic and/or other techniques.

Instructions are provided to memory from a storage device, such as magnetic disk, a read-only memory (ROM) integrated circuit, CD-ROM, DVD, via a remote connection (e.g., over a network via network interface 530) that is either wired or wireless providing access to one or more electronically-accessible media, etc. In alternative embodiments, hard-wired circuitry can be used in place of or in combination with software instructions. Thus, execution of sequences of instructions is not limited to any specific combination of hardware circuitry and software instructions.

An electronically-accessible medium includes any mechanism that provides (i.e., stores and/or transmits) content (e.g., computer executable instructions) in a form readable by an electronic device (e.g., a computer, a personal digital assistant, a cellular telephone). For example, a machine-accessible medium includes read only memory (ROM); random access memory (RAM); magnetic disk storage media; optical storage media; flash memory devices; electrical, optical, acoustical or other form of propagated signals (e.g., carrier waves, infrared signals, digital signals); etc.

In one embodiment, eyetracking device 550 generates raw data representing eye position and movement. In one embodiment, the raw data is transferred via bus 501 to memory 504 and stored as eyetracking data 566. In an alternate embodiment, eyetracking data 566 includes higher-order interpretations based on underlying raw eyetracking data. Processor 502 executes eye aware application(s) 562 that are responsive to eyetracking data 566.

At the lowest level, eyetracking data is interpreted to identify elementary features. Eyetracking data can be, for example, two-dimensional (x,y) eye gaze positions, three-dimensional (x,y,z) gaze positions, sample time (t), pupil diameter (d), (optionally) the object being viewed (which can be a computer screen, a face, or any object in the world), whether the eye is open or closed, and/or other related information such as biofeedback (e.g., sweat, temperature, heart rate, breathing rate) information. Gaze information can include position, duration, latency and/or other information related to a particular gaze. Elementary features that are determined from the eyetracking data can be, for example, fixations (position, time and/or duration), saccades (magnitude, direction and/or velocity), smoother pursuit motion (path taken by eye, velocity), blinks (duration).

In one embodiment, a fixation is defined as a statistically significant clustering of raw eyetracker data within some space-time interval. A fixation may be identified by analyzing the raw eyetracker data stream to determine if most of the eye positions during a predetermined minimum fixation time interval are within a predetermined minimum fixation space interval. For example, the raw eyetracker data stream can be analyzed to determine whether at least 80% of the eye positions during a 100 ms time interval are within a 0.25 degree space interval. Other values can also be used and other techniques can be used to identify a fixation. Many techniques are known in the art and other techniques for identifying fixations can be used.

A saccade can be defined as the displacement and direction between two fixations. Other elementary features, for example, blinks, smooth pursuit motion and the angel of eye rotation within the head can also be determined from the raw eyetracker data stream.

The elementary features can then be interpreted to determine eye movement patterns. Eye movement patterns can include, for example, revisits, significant fixations, vertical saccades, horizontal saccades, short saccade runs, etc. In one embodiment, an eye movement pattern is a collection of elementary features that satisfies a set of criteria associated with a predetermined eye movement pattern template. In one embodiment, elementary feature data is analyzed after each saccade to determine whether a predefined eye movement pattern exists.

The eyetracker described herein may be associated with, or included in, any type of device for which eyetracking data may be useful. For example, in addition to computer systems with monitors or other display devices, the eyetracker may be in an automobile, a kiosk, a personal digital assistant (PDA), a toy, a game device, a billboard, a telephone, a cellular phone, a television or other monitor not coupled with a computer system, a refrigerator or other appliance, a set-top box, training equipment or educational device, such as books, or other devices providing visual information, glasses, a video conferencing system, mounted on a wall or in any space, etc.

Reference in the specification to "one embodiment" or "an embodiment" means that a particular feature, structure, or characteristic described in connection with the embodiment is included in at least one embodiment of the invention. Use of the phrase "in one embodiment" in various places in the specification are not necessarily all referring to the same embodiment.

In the foregoing specification, the invention has been described with reference to specific embodiments thereof. It will, however, be evident that various modifications and changes can be made thereto without departing from the broader spirit and scope of the invention. The specification and drawings are, accordingly, to be regarded in an illustrative rather than a restrictive sense.

What is claimed is:

1. A method comprising:
electronically storing viewing data relating to the viewing of visual stimuli;
electronically storing parameters related to the stored viewing data;
electronically receiving a first visual stimulus for analysis;
electronically matching target parameters for the first visual stimulus with the parameters for the stored viewing data; and
if there is a sufficient match between the target parameters with the parameters for the stored viewing data, electronically generating data to represent the first visual stimulus based at least in part on the stored viewing data.

2. The method of claim 1, wherein the stored parameters include information regarding the visual stimuli.

3. The method of claim 1, wherein the stored parameters include information regarding test participants who viewed the visual stimuli.

4. The method of claim 1, wherein generating data to represent the first visual stimulus includes electronically identifying stored viewing data for a stimulus to represent the first visual stimulus.

5. The method of claim 1, wherein generating data to represent the first visual stimulus includes electronically identifying stored viewing data for a combination of stimuli to represent all or a part of the first visual stimulus.

6. The method of claim 5, wherein identifying stored viewing data for a combination of stimuli includes electronically identifying viewing data for a plurality of stimuli that may be blended together to represent all or a part of the first visual stimulus.

7. The method of claim 1, wherein generating data to represent the first visual stimulus includes electronically combining viewing data for a first portion of the first visual stimulus with stored viewing data identified to represent a second portion of the first visual stimulus.

8. The method of claim 7, wherein the second portion of the first visual stimulus is a portion that has been added to the first visual stimulus or that has been moved in the first visual stimulus.

9. The method of claim 1, wherein the target parameters for the first visual stimulus are received with the first visual stimulus.

10. The method of claim 1, further comprising generating the target parameters for the first visual stimulus.

11. The method of claim 1, wherein the parameters related to the stored viewing data and/or the target parameters for the first visual stimulus are entered by individuals.

12. The method of claim 1, wherein the parameters related to the stored viewing data and/or the target parameters for the first visual stimulus are entered automatically.

13. A system comprising:
a database to store viewing data relating to viewing of a plurality of visual stimuli, the viewing data to include parameters regarding the stored viewing data; and
a processor to process requests for generation of data to represent a visual stimulus;
wherein the processor is to search the database to identify stored viewing data to represent all or a part of a requested visual stimulus, the search including a comparison of the parameters regarding the stored viewing data with target parameters for the requested visual stimulus.

14. The system of claim 13, wherein the stored parameters include information regarding the plurality of visual stimuli.

15. The system of claim 13, wherein the stored parameters include information regarding test participants who viewed the plurality of visual stimuli.

16. The system of claim 13, wherein generating data to represent the requested visual stimulus by the processor includes identifying stored viewing data for a stimulus to represent the requested visual stimulus.

17. The system of claim 13, wherein generating data to represent the requested visual stimulus by the processor includes identifying stored viewing data for a combination of stimuli to represent the requested visual stimulus.

18. The system of claim 13, wherein generating data to represent the requested visual stimulus by the processor includes combining:
viewing data that was collected for a first portion of the requested visual stimulus, and
stored viewing data that is identified to represent a second portion of the second visual stimulus.

19. The system of claim 13, wherein processor is to automatically enter the parameters for the stored viewing data and/or the target parameters for the requested visual stimulus.

20. The system of claim 13, wherein the parameters for the stored viewing data and/or the target parameters for the requested visual stimulus are entered by individuals.

21. A computer-readable medium having stored thereon data representing sequences of instructions that, when executed by a computer, cause the computer to perform operations comprising:
storing viewing data relating to the viewing of visual stimuli;
storing parameters related to the stored viewing data;
receiving a first visual stimulus for analysis;
matching target parameters for the first visual stimulus with the parameters for the stored viewing data; and
if there is a sufficient match between the target parameters with the parameters for the stored viewing data, generating data to represent the first visual stimulus based at least in part on the stored viewing data.

22. The medium of claim 21, wherein the stored parameters include information regarding the visual stimuli.

23. The medium of claim 21, wherein the stored parameters include information regarding test participants who viewed the visual stimuli.

24. The medium of claim 21, wherein generating data to represent the first visual stimulus includes identifying stored viewing data for a stimulus to represent the first visual stimulus.

25. The medium of claim 21, wherein generating data to represent the first visual stimulus includes identifying stored viewing data for a combination of stimuli to represent all or a part of the first visual stimulus.

26. The medium of claim 25, wherein identifying stored viewing data for a combination of stimuli includes identifying viewing data for a plurality of stimuli that may be blended together to represent all or a part of the first visual stimulus.

27. The medium of claim 21, wherein generating data to represent the first visual stimulus includes combining viewing data for a first portion of the first visual stimulus with stored viewing data identified to represent a second portion of the first visual stimulus.

28. The medium of claim 27, wherein the second portion of the first visual stimulus is a portion that has been added to the first visual stimulus or that has been moved in the first visual stimulus.

29. The medium of claim 21, wherein the target parameters for the first visual stimulus are received with the first visual stimulus.

30. The medium of claim 21, wherein the medium further comprises instructions that, when executed by a computer, cause the computer to perform operations comprising generating the target parameters for the first visual stimulus.

31. The medium of claim 21, wherein the parameters related to the stored viewing data and/or the target parameters for the first visual stimulus are entered by individuals.

32. The medium of claim 21, wherein the parameters related to the stored viewing data and/or the target parameters for the first visual stimulus are entered automatically.

* * * * *